United States Patent
Kviatkovsky et al.

(10) Patent No.: US 11,537,813 B1
(45) Date of Patent: Dec. 27, 2022

(54) SYSTEM FOR SYNTHESIZING DATA

(71) Applicant: AMAZON TECHNOLOGIES, INC., Seattle, WA (US)

(72) Inventors: Igor Kviatkovsky, Haifa (IL); Nadav Israel Bhonker, Haifa (IL); Alon Shoshan, Haifa (IL); Manoj Aggarwal, Seattle, WA (US); Gerard Guy Medioni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 165 days.

(21) Appl. No.: 17/038,648

(22) Filed: Sep. 30, 2020

(51) Int. Cl.
*G06K 9/62* (2022.01)
*G06N 20/00* (2019.01)
*G06V 10/145* (2022.01)
*G06V 40/13* (2022.01)
*G06V 40/12* (2022.01)

(52) U.S. Cl.
CPC .......... *G06K 9/6256* (2013.01); *G06N 20/00* (2019.01); *G06V 10/145* (2022.01); *G06V 40/1318* (2022.01); *G06V 40/1347* (2022.01)

(58) Field of Classification Search
CPC ............... G06K 9/6256; G06V 10/145; G06V 40/1318; G06V 40/1347
See application file for complete search history.

(56) References Cited

U.S. PATENT DOCUMENTS

2016/0035078 A1* 2/2016 Lin .................. G06K 9/6255 382/157
2016/0259994 A1* 9/2016 Ravindran .......... G06K 9/6274

FOREIGN PATENT DOCUMENTS

CN 104851099 A * 8/2015 ............. G06T 7/344

OTHER PUBLICATIONS

Gecer, et al., "Synthesizing Coupled 3D Face Modalities by Trunk-Branch Generative Adversarial Networks", Imperial College, London, UK, FaceSoft.io, London, UK, pp. 1-19. Retrieved from the Internet: URL: https://arxiv.org/pdf/1909.02215.pdf.

Hong, et al., "How Generative Adversarial Networks and Their Variants Work: An Overview", Department of Electrical and Computer Engineering, Seoul National University, Seoul, Korea, pp. 1-41. Retrieved from the Internet: URL: https://arxiv.org/pdf/1711.05914.pdf.

(Continued)

*Primary Examiner* — Abhishek Sarma
(74) *Attorney, Agent, or Firm* — Lindauer Law, PLLC

(57) ABSTRACT

During a training phase, a first machine learning system is trained using actual data, such as multimodal images of a hand, to generate synthetic image data. During training, the first system determines latent vector spaces associated with identity, appearance, and so forth. During a generation phase, latent vectors from the latent vector spaces are generated and used as input to the first machine learning system to generate candidate synthetic image data. The candidate image data is assessed to determine suitability for inclusion into a set of synthetic image data that may be used for subsequent use in training a second machine learning system to recognize an identity of a hand presented by a user. For example, the candidate synthetic image data is compared to previously generated synthetic image data to avoid duplicative synthetic identities. The second machine learning system is then trained using the approved candidate synthetic image data.

20 Claims, 6 Drawing Sheets

(56) References Cited

OTHER PUBLICATIONS

Karras, et al., "StyleGAN2—Official TensorFlow Implementation", NVIDIA Corporation, 2019, 9 pages. Retrieved from the Internet: URL: https://github.com/NVlabs/stylegan2.

Orieux, et al., "Sampling high-dimensional Gaussian distributions for general linear inverse problems". IEEE Signal Processing Letters, Institute of Electrical and Electronics Engineers, 2012, 19 (5), 5 pages. Retrieved from the Internet: URL: https://hal.archives-ouvertes.fr/hal-00779449/document.

Tiu, Ekin, "Understanding Latent Space in Machine Learning", Towards Data Science, pp. 1-9. Retrieved from the Internet: URL: https://towardsdatascience.com/understanding-latent-space-in-machine-learning-de5a7c687d8d.

Waisel, Amit, "High-dimension Gaussians: Separating Gaussians, Fitting Spherical Gaussian to Data", 24 pages. Retrieved from the Internet: URL: http://www.cs.tau.ac.il/~haimk/data-science-seminar/lecture-amit_waisel.pdf.

"A Method for Training Explicitly Controllable GANs via Contrastive Learning", CVPR 2021 Submission #1862, 9 pages.

* cited by examiner

SYSTEM FOR SYNTHESIZING DATA

BACKGROUND

Performance of a machine learning system is improved by using a large set of input data for purposes such as training or evaluation.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
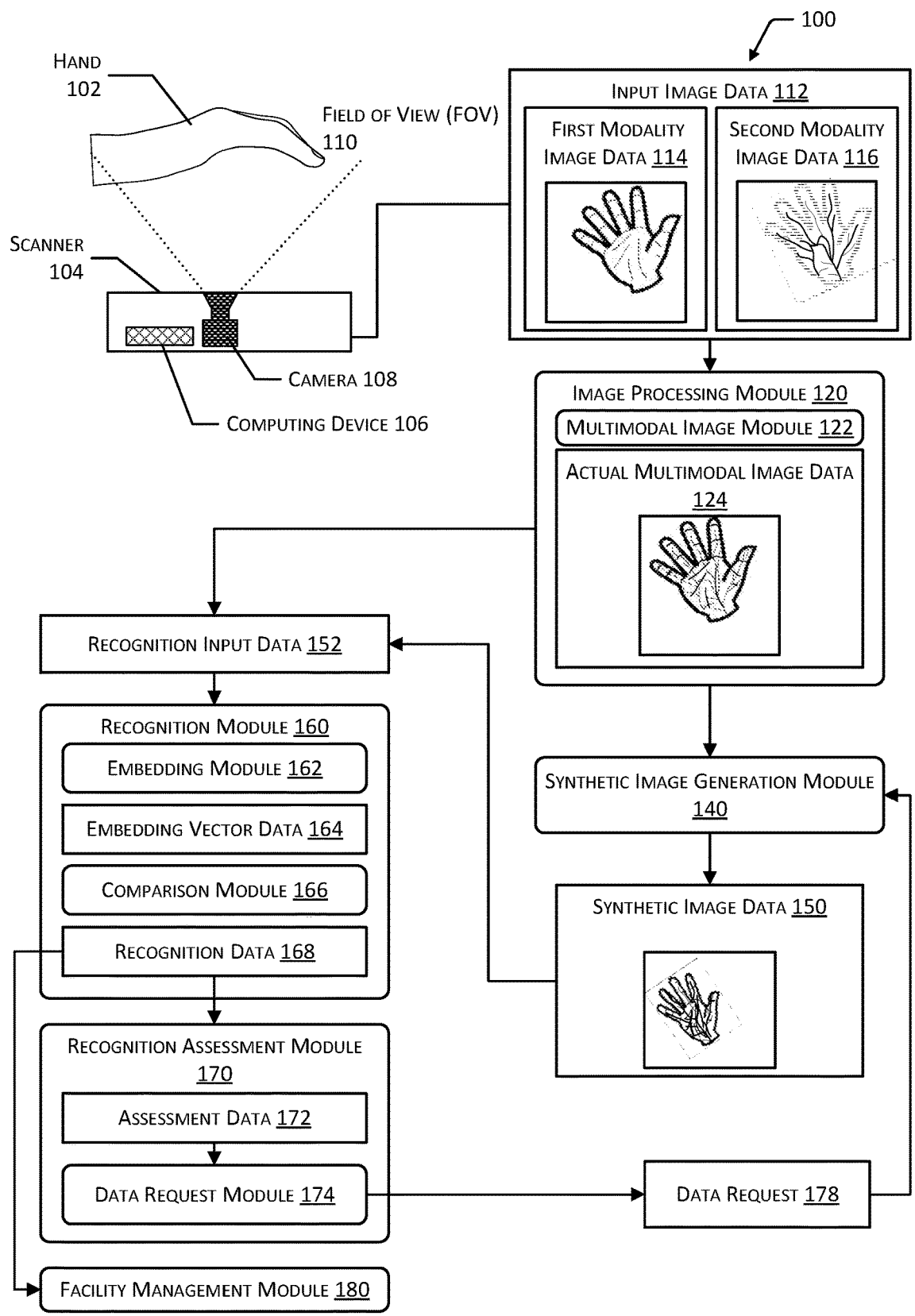
FIG. 1 illustrates a system to provide data to a first machine learning system that is trained to recognize a user based on images acquired using a plurality of modalities, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a material handling facility (facility), office, transportation facility, or other location may be controlled based on user identity. As the user enters the facility, they may be identified using the devices and techniques described herein.

Traditional systems for identifying users suffer from several significant drawbacks including susceptibility to fraud, slow speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred.

Biometric identification systems that use machine learning systems, such as artificial neural networks, may be trained or evaluated using input data. For example, a system that is trained to recognize features in an image of a human palm may be trained using images of actual human palms. Continuing the example, once trained, the system may be evaluated. Training of machine learning systems may require large sets of unique data. In many situations, the larger the set of input data used to train the system, the greater the accuracy of the results produced by the machine learning system. Likewise, once trained the system may be more effectively evaluated using a large set of input data. Continuing the example, a set of input data used to train or evaluate a machine learning system may include millions of images of different human palms. The input data used to train the system may be distinct from, and disjoint to, the input data used to evaluate the system once trained. It may be infeasible to acquire such a large set of input data. For example, the cost to acquire images of millions of different hands on different people may be prohibitive. Previously acquired sets of images acquired for different purposes may be unusable due to inadequate data. For example, red-green-blue (RGB) images of the surfaces of human palms may be inadequate to train a system that attempts to recognize users based on multimodal data that includes surface features and sub-surface features such as veins or other anatomical features.

The development of input data is further complicated if the presentation of the object being depicted may change due to changes in pose, articulation, illumination, size, and so forth. For example, a user holding their hand over a scanning device that includes an upward facing camera to acquire multimodal images may have their palm tilted at various angles, finger joints may be bent, distance from the camera may change, and so forth. Due to the additional degrees of freedom that are provided to the unconstrained hand, the image produced by this type of system may exhibit significant variability. As a result of this real-world variability, input data may need to replicate different appearances of at least part of a hand in different poses, articulation, under different lighting conditions, and so forth.

Training of a recognition system that uses machine learning involves the use of input data. For example, a deep learning neural network may be trained using a set of input data. Performance of the recognition system improves as a size of samples in the set of input data increases. However, quality of the samples in the set of input data is important. For example, samples within the input data should not be too similar, should be consistent with the data that will be provided as input to the recognition system, and so forth. Inadequate input data can result in the recognition system being trained incorrectly or insufficiently. Once trained, the recognition system may be evaluated using additional input data that is different from that used during training. For example, the recognition system is trained using a first set of input data while the recognition system is evaluated using a second set of input data, with the data in the first set being disjoint or different from the data in the second set.

Described in this disclosure are techniques for generating and assessing synthetic data for suitability to use as input data. The techniques to generate synthetic data allow the synthetic data to be generated in a controlled fashion. For example, different samples of synthetic data may be produced that are representative of the same (synthetic) identity but with different appearances, different (synthetic) identities but with the same appearance, and so forth. The synthetic data may be included in a set of recognition input data that is then used to train a recognition system to recognize identities of users in actual data.

The use of the techniques described herein allows for a relatively small subset of actual data, such as pairs of multimodal image data of the hands of 25,000 users, to be leveraged to create a much larger set of realistic input data, such as several million synthetic users. This substantially reduces the resources such as time and cost that would otherwise be needed to generate a large set of input data, compared to acquisition of actual data. By providing the large set of input data, one or more of the training or the evaluation of the recognition system is substantially improved. This results in substantial improvements to the accuracy of the machine learning system in accurately recognizing actual users during operation.

The system uses actual image data that is acquired from actual people. For example, users may present their hand to a scanner that acquires images of the hand. A series of images may be acquired in one or more modalities. For example, an image in a first modality may depict surface features of the hand while an image in a second modality depicts deeper features such as veins.

The actual image data is used to train a synthetic image generation module that is used to generate synthetic image data. The synthetic image generation module may comprise a generative adversarial network (GAN). The GAN is provided with the actual image data and is trained to produce synthetic image data. As a result of the training, the GAN has determined various latent vectors and their associated latent vector spaces. A first latent vector space may be representative of appearance of the hand. For example, appearance may comprise pose, articulation, lighting, jewelry, clothing, and so forth. A second latent vector space may be representative of identifying features or aspects of the hand. For example, identifying features may comprise the arrangement of features such as creases, ridges, veins, joints, and so forth.

During training of the GAN, a generative network of the GAN may generate a first output image and a second output image during each iteration. Each output image comprises multimodal data. A discriminator module of the GAN that is trained on the actual input data performs an initial determination as to whether the first output image and the second output image are each sufficiently realistic compared to the actual input data. For example, the discriminator module may produce discriminator loss data that is a variance of the output image relative to the actual image data used to train the discriminator module. Additional tests are also performed on the first output image and the second output image.

The additional testing during training of the GAN may include processing the first output image and the second output image to determine embedding vector data for each. Because the latent vectors used to generate the first output image and the second output image are known, information is available to as to possible relationships between the two images. For example, if both images result from the same latent vector associated with appearance, they should have a similar appearance. Likewise, if both images result from the same latent vector associated with identification, they should produce similar embedding vector data.

Backpropagation data may be generated that is indicative of loss values associated with the loss functions associated with processing the first output image and the second output image. The backpropagation data may include loss data such as the discriminator loss data, as well as loss data associated with the embedding vector determination. For example, appearance loss data of latent vectors associated with appearance should be minimal between a first output image and a second output image that use the same synthetic appearance vector as input. In another example, identification loss data of latent vectors associated with identification should be minimal between the first output image and the second output image that use different synthetic identification vectors as input. The loss data may be provided as backpropagation data to facilitate training of the GAN.

Once the GAN has been trained, it may be used to generate synthetic input data. Synthetic vectors may be generated, as constrained by the respective latent vector spaces, to produce synthetic input data with various desired characteristics. For example, a synthetic appearance vector may be generated that is within the latent first vector space. In another example, a synthetic identification vector may be generated that is within the latent second vector space. The synthetic vectors may be randomly generated, such as by sampling from a high-dimensional Gaussian of data. In some implementations, ranges may be applied to particular synthetic vectors. For example, synthetic appearance vectors may be constrained to produce synthetic input data that appears to depict jewelry on a hand. In another example, a previously used synthetic identification vector may be used in conjunction with different synthetic appearance vectors to provide synthetic input data that appears to show the same identity but with different appearances. As a result, particular synthetic input data may be produced by controlling the synthetic vectors that are provided as input to a trained GAN.

The synthetic vectors are provided as input to the trained GAN that then produces candidate synthetic image data. For example, the candidate synthetic image data may comprise a synthetic multimodal image that includes in one channel a first modality synthetic image of a synthesized hand's surface features and in a second channel a second modality synthetic image of the synthesized hand's veins and other features.

The candidate synthetic image data generated by the trained GAN responsive to the synthetic vectors is assessed for suitability to include in the set of input data for a recognition system. In some instances, the candidate synthetic image data may not be suitable for use in training. For example, the candidate synthetic image data may represent a synthetic identity that is too similar to an existing identity.

The candidate synthetic image data may be processed by the recognition system to determine embedding vector data that is representative of the candidate synthetic image. The candidate synthetic image data may have its embedding vector data compared to previously stored data. For example, the embedding vector data is compared to previously stored data to determine a set of k embedding vectors that are closest in an embedding space. If the closest embedding vector is greater than a threshold distance in the embedding space, the candidate synthetic image data may be deemed sufficiently unique and stored for later use as input data for the recognition system.

If the closest embedding vector to the embedding vector data associated with the candidate synthetic image data is less than the threshold distance in the embedding space, an additional assessment may be performed. Image data associated with the closest embedding vector and the candidate synthetic image data may be assessed by a verification module.

The verification module may accept as input the candidate synthetic image data and the image data associated with the k closest embedding vectors. The verification module determines a score that is indicative of a likelihood that the candidate synthetic image data and the image data express different identities. If the score is greater than a threshold value, the candidate synthetic image data may be stored for later use as input data. If the score is less than the threshold value, the candidate synthetic image data may be discarded.

The process may be performed to generate a set of input data comprising any number of samples of synthetic image data that are suitable for various uses, such as training or evaluating a recognition system. The synthetic image data may be generated on demand, or stored for later use. The determination of synthetic vectors used as input to the GAN to create the candidate synthetic data may be responsive to evaluation of the recognition system. For example, if the recognition system is undertrained for a particular demographic of actual user, synthetic vectors may be used to provide synthetic input data that is consistent with that demographic. As a result, the recognition system is able to be trained to provide highly accurate recognition of users during operation.

Illustrative System

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112 obtained using two or more modalities. The scanner 104 may include other components which are not shown. For example, the scanner 104 may include lights that illuminate the object in the FOV 110.

In the implementation depicted, the hand 102 is held above the camera 108, with the FOV 110 extending upward. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Other configurations to acquire input image data 112 may also be used. For example, the camera 108 may have the FOV 110 extending downwards, and the user may place their hand 102 in the FOV 110 under the scanner 104.

The scanner 104 is configured to acquire multimodal images of the hand 102. A first modality may acquire images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may acquire images in which the hand 102 is illuminated with light having a second polarization and obtained by the camera 108 with the polarizer passing light to the camera 108 with the first polarization. For example, the second modality features may include anatomical structures such as veins, bones, soft tissue, or other sub-surface features. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 is too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

An image processing module 120 may receive the input image data 112 and perform additional processing. A multimodal image module 122 may be used to generate actual multimodal image data (AMID) 124. The multimodal image module 122 may generate the AMID 124 by combining data from two or more modality images into a single image. For example, the first modality image data 114 and the second modality image data 116 may each comprise grayscale images. The multimodal image module 122 may combine the two images to generate the AMID 124. For example, first grayscale data from the first modality image data 114 may be stored as a first channel of the AMID 124 while second grayscale data from the second modality image data 116 may be stored as a second channel of the AMID 124. In some implementations the multimodal image module 122 may provide other functions. For example, the multimodal image module 122 may align the first modality image data 114 and the second modality image data 116. This alignment may include one or more of rotation or translation of a portion of the images.

Traditionally, input data used to train a machine learning system to recognize features is unique and extensive. For example, to recognize a particular hand as depicted in an AMID 124, the machine learning system would be trained using a set of multimodal images of hundreds of thousands of unique hands. A hand may be considered unique if the features of that hand differ sufficiently from other previously known hands. For example, the features of a hand may be expressed as vector values. The vector values for a particular hand describe a particular location in a vector space. If a first location in vector space for a first hand is greater than a minimum distance away from a second location in the vector space of a second hand, the two may be deemed to be unique with respect to one another. If the first location in the vector space for the first hand is less than a specified distance away from the second location in vector space, the second hand and the first hand may be deemed to be the same.

Acquiring actual multimodal image data 124 for hundreds of thousands or millions of samples, such as hands, may be infeasible. For example, such acquisition may be too costly, take too much time, and so forth. Additionally, acquisition may include incomplete samples of users that are associated with different categories. For example, a set of actual multimodal image data 124 may predominately comprise samples of users that are between the ages of 20 and 30 years old, while few samples of users between the ages of 70 and 90 years may be available. Inadequate input data for one or more categories may result in incomplete or inadequate training of the recognition module. Continuing the example, with insufficient samples in the input data, users in the category of age 70-90 may experience poorer performance during recognition operations, compared to users in the category of age 20-30. Poor performance can result in the recognition being unsuitable for use, result in a poor user experience, and so forth.

Described in this disclosure are techniques for generating recognition input data 152 to train a recognition module 160 comprising a machine learning system. The recognition input data 152 may comprise at least a portion of the actual multimodal image data 124, synthetic image data 150, or a combination thereof. For example, the recognition input data 152 may comprise 5000 samples of actual multimodal image data 124 and 2 million samples of synthetic image data 150.

A synthetic image generation module 140 is trained using a relatively small set of actual multimodal image data 124 to generate candidate synthetic image data. The synthetic image generation module 140 may also assess the candidate synthetic image data for suitability to use as synthetic image data 150 that is included in the recognition input data 152. Operation of the synthetic image generation module 140 is discussed with regard to FIGS. 2-4.

The recognition module 160 comprises a machine learning system, such as a deep learning convolutional neural network. The recognition input data 152 may comprise the input image data 112, the actual multimodal image data 124, or the synthetic image data 150, or portions thereof. The recognition module 160 is trained to determine an identity associated with the input provided to it. The recognition input data 152 may comprise samples representing different identities, actual or synthetic.

During a production phase, the trained recognition module 160 may accept as input the actual multimodal image data (AMID) 124 resulting from input image data 112 acquired by a scanner 104. The recognition module 160 may use an embedding module 162 to determine embedding vector data 164. The embedding vector data 164 may be considered a set of values that are descriptive of the hand 102 or other object depicted in the AMID 124, and may act as a signature that is uniquely associated with the identity of the user.

The embedding module 162 may comprise a neural network that utilizes a margin-loss based model for training. One implementation of margin-loss models for training neural networks are described by Gao, R., Yang, F., Yang, W., & Liao Q. "Margin loss: Making faces more separable", *IEEE Signal Processing Letters,* 25(2), 308-312, 2018. Another implementation of margin-loss models for training convolutional neural networks are described by Liu, W., Wen, Y., Yu, Z., & Yang, M., "Large-margin softmax loss for convolutional neural networks". *International Conference on Machine Learning,* (Vol. 2, No. 3, p. 7, June 2016).

A comparison module 166 may compare the embedding vector data 164 from the AMID 124 with previously stored signatures, each signature comprising embedding vector data 164 that is associated with a particular user that is either actual or synthetic. A confidence value may be determined that is indicative of similarity between the embedding vector data 164 and a reference signature that has been previously stored. For example, the confidence value may be determined based on a Euclidean distance in the vector space between the embedding vector data 164 from the AMID 124 and the reference signature. In other implementations, other techniques may be used to compare the AMID 124 or features therein with previously stored data.

The synthetic image generation module 140 may use a previously trained version of the recognition module 160 to assess candidate synthetic image data. For example, the recognition module 160 may be used to determine embedding vector data 164 associated with the candidate synthetic image data. The comparison module 166 may then be used to determine if that embedding vector data 164 is sufficiently unique relative to previously stored embedding vector data 164. Candidate synthetic image data that is not sufficiently unique may be disregarded and not included in the synthetic image data 150.

The comparison module 166 may use the embedding vector data 164 produced by the embedding module 162 to determine recognition data 168. The recognition data 168 may comprise information that is indicative of a likelihood that multimodal image data provided as input to the recognition module 160 corresponds to previously stored embedding vector data 164. The recognition data 168 may comprise a confidence value indicative of likelihood that the identification is accurate and a user identifier. For example, the recognition data 168 may indicate "{confidence}=0.97, {useridentifier}=6c6f6d616e2c770a0a". The recognition data 168 may be compared to embedding vector data 164 associated with actual users during production use, or embedding vector data 164 corresponding to synthetic image data 150 during training and assessment of training.

In one implementation, during an enrollment phase, a user may opt in to present their hand 102. Additional information may be obtained from the user, such as name, contact information, demographic data, payment account information, and so forth. An identity of a particular user may be asserted with the AMID 124, and the embedding vector data 164 associated with that particular user. During subsequent interactions, the user may present their hand 102 at a scanner 104. The resulting AMID 124 may be processed by the recognition module 160 to determine that the AMID 124 corresponds to within a threshold value of previously stored data. For example, if the embedding vector data 164 corresponding to the AMID 124 presented by the user is within a threshold distance in the vector space of a previously stored vector, the identity associated with the previously stored vector may be asserted to the user in the recognition data 168.

A recognition assessment module 170 may be used to determine assessment data 172 that is indicative of performance of the recognition module 160. The recognition data 168 may be compared to one or more thresholds to determine the assessment data 172. For example, the assessment data 172 may indicate that an average confidence value associated with the produced recognition data 168 is less than a threshold value. A data request module 174 may determine, based on the assessment data 172, a data request 178. For example, if the assessment data 172 indicates that the average confidence value for a first set of recognition input data 152 is less than a threshold value, the data request module 174 may generate a data request 178. The data request 178 may be provided to the synthetic image generation module 140 that determines, based on the data request 178, a second set of synthetic image data 150 that may be subsequently used as recognition input data 152.

In some implementations, the recognition assessment module 170 may determine that performance of the recognition module 160 with respect to one or more category types is inadequate. For example, during evaluation of the recognition module 160, recognition input data 152 associated with a category type of age 70-90 may have an average confidence value that is less than a threshold value that is deemed adequate. The data request module 174 may generate a data request 178 that is indicative of the category type of age 70-90.

Responsive to the data request 178, the synthetic image generation module 140 may generate additional synthetic image data 150 that includes more samples of synthetic image data 150 that are associated with the category type of age 70-90. For example, synthetic vectors corresponding to the category type may be used to generate additional candidate synthetic image data that is then tested for suitability for use as synthetic image data 150. As a result, a second set of recognition input data 152 that differs from the first set of recognition input data 152 previously used is generated. For example, the synthetic image generation module 140 may increase the percentage of synthetic image data 150 for the category type of age 70-90, providing additional samples of this category type for the recognition module 160 to be trained with. The recognition module 160 may be subsequently trained using this second set of recognition input data 152. The presence of the additional synthetic examples of the particular category type may result in improved performance of the recognition module 160 while processing data associated with that category type.

During operation of the recognition module 160, a user identifier that is associated with the reference signature that is most similar to the AMID 124 may be determined to be the identity of the user. The comparison module 166 may produce the recognition data 168 during production use. For example, the user identifier associated with the reference signature may be associated with the user who presented their hand 102.

The recognition data 168 may provide information such as one or more of a user identifier associated with the user, a location or identification of the scanner 104, data indicative of date and time that the AMID 124 was obtained, and so forth. The recognition data 168 may be subsequently used for various purposes. For example, if the user has been granted access to the facility, a command may be issued to open a gate or door so the user may enter the facility. In another example, the recognition data 168 may be used to determine a payment account or other credentials associated with the user which may then be used in a financial transaction. In yet another example, the recognition data 168 may be passed to a facility management module 180.

The facility management module 180 may use the recognition data 168 to associate an identity with the user as they move about the facility. For example, the facility management module 180 may use data from cameras or other sensors in the environment to determine a location of the user. Given a known path of the user from the gate, the user identity indicated in the recognition data 168 may be associated with the user as they use the facility. For example, the now identified user may walk to a shelf, remove an item, and leave the facility. The facility management module 180 may determine the interaction data indicative of the removal of the item as being associated with the user identifier specified in the recognition data 168, and bill an account associated with the user identifier.

The systems and techniques described above are discussed with respect to images of human hands. These systems and techniques may be used with respect to other forms of multimodal data, other kinds of objects, and so forth.

Figure 2A:
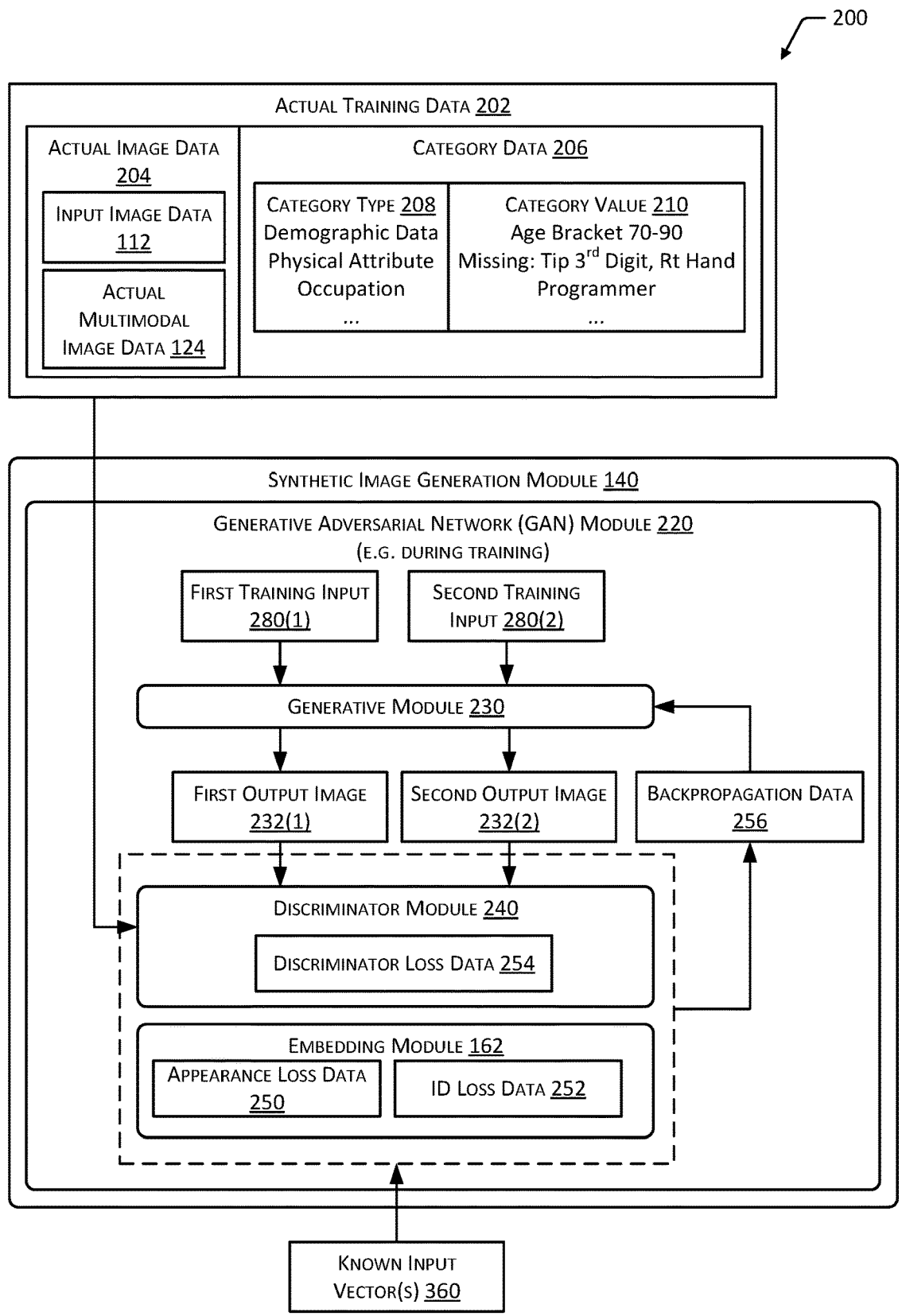
FIGS. 2A and 2B illustrate training of a second machine learning system to generate synthetic multimodal image data, according to some implementations.
Figure 2B:
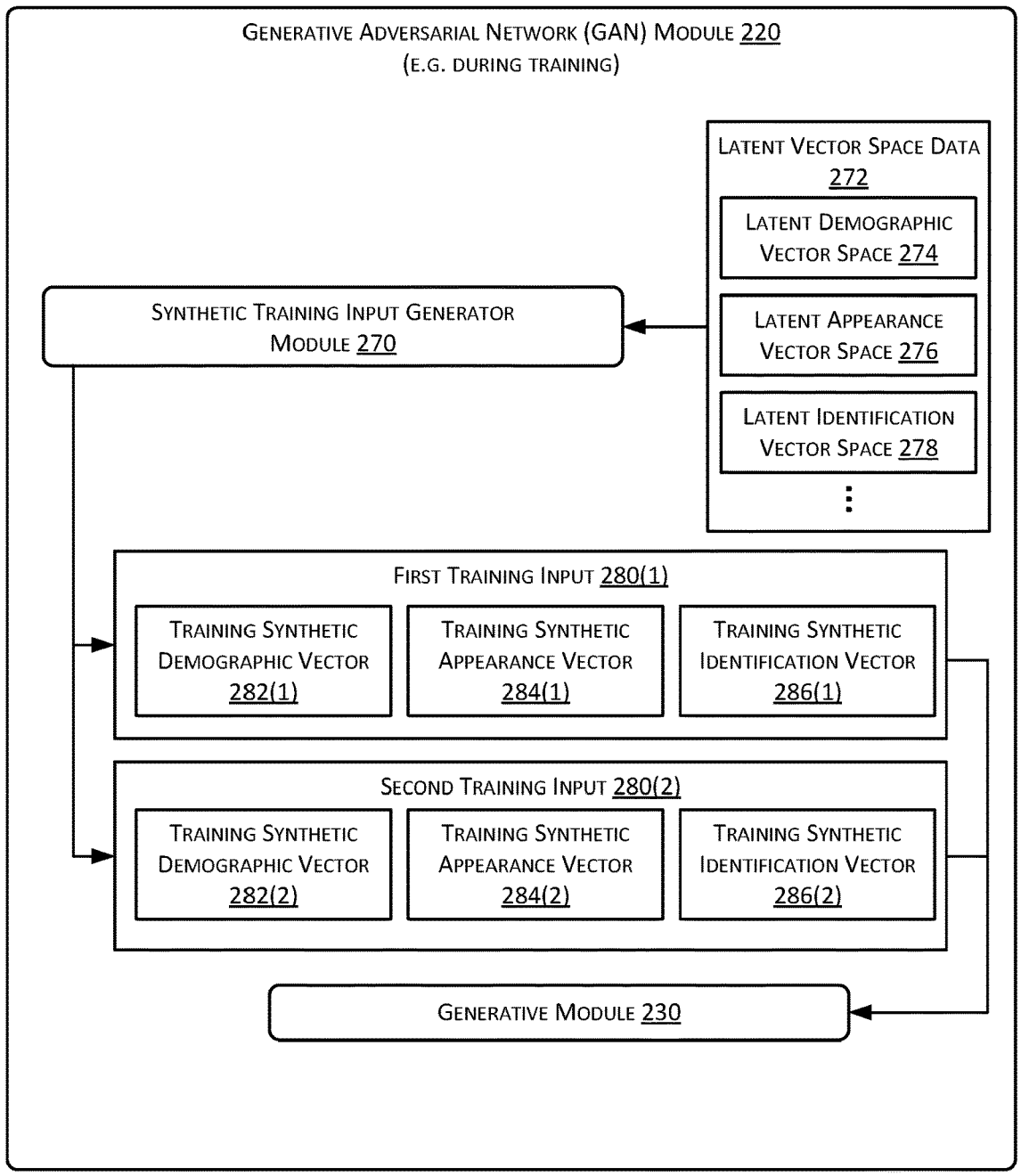

FIGS. 2A and 2B illustrate at 200 training of a synthetic image generation module 140, according to some implementations. As shown in FIG. 2A, actual training data 202 comprises a set of actual image data 204. In some implementations, the actual training data 202 may include category data 206 that is associated with the actual image data 204. The actual image data 204 may comprise one or more of input image data 112 or actual multimodal image data 124.

The category data 206 may comprise a category type 208 and associated category value(s) 210. For example, the category types 208 may include, but are not limited to, demographic data, physical attribute, occupation, and so forth. The demographic data may comprise information including, but not limited to age, residence, gender, ethnicity, and so forth. Data about the physical attributes may include information indicative of scars, tattoos, birthmarks, missing digits, and so forth. For example, the physical attribute data associated with the hand 102 may indicate that a tip of a particular finger is missing on the right hand. The category data 206 may be associated with factors that could affect operation of the system 100. For example, occupation data may be used to facilitate recognition of users who are involved in occupations that may change the physical appearance of theirs hands. Continuing the example, users who have the occupation "bricklayer" may have more callouses and thus different features on their hands than users who have the occupation "programmer".

A user may choose to opt in during enrollment and provide category values 210 for at least a portion of the category data 206. For example, while setting up an account, the user may choose to enter their occupation. The category data 206 may be used to facilitate subsequent iterations of training the recognition module 160. For example, if particular category values 210 are underrepresented in the actual training data 202, additional synthetic image data 150 may be generated that corresponds to the particular category values 210.

During training, the synthetic image generation module 140 accepts as input the actual training data 202. The synthetic image generation module 140 may comprise a generative adversarial network (GAN) module 220. The GAN module 220 may comprise a generative module 230 comprising a generative neural network and a discriminator module 240 comprising a discriminator neural network.

The generative module 230 may accept pairs of training input 280 during training. Each pair of training input 280 may comprise one or more synthetic latent vectors, as described in FIG. 2B. For example, the training input 280 may comprise a synthetic appearance vector 284 and a synthetic identification vector 286. The training input 280 may be randomly generated during training of the GAN.

The generative module 230 may implement a generative adversarial network that produces a first output image 232(1) and a second output image 232(2). The first output image 232(1) results from the first training input 280(1) while the second output image 232(2) results from the second training input 280(2). For example, each of the output images 232 may comprise multimodal image data.

Some implementations of GANs are described by Ian Goodfellow (Dec. 31, 2016), "NIPS 2016 Tutorial: Generative Adversarial Networks", arXiv:1701.00160. In one implementation, the GAN module 220 may implement a STYLEGAN2 network as promulgated by Nvidia Corporation of Santa Clara, Calif., United States of America with information available at "github.com/NVlabs/stylegan2". In another implementation, the synthetic image generation module 140 may use a variational autoencoder (VAE), or other techniques. Some implementations of VAE are described by Carl Doersch (Jun. 19, 2016), "Tutorial on Variational Autoencoders", arXiv:1606.05908.

In some implementations the GAN module 220 may be trained to produce canonical output images 232. For example, the canonical output images 232 may have a consistent size, orientation, overall appearance, and so forth.

The discriminator module 240 is trained using the actual image data 204. The first output image 232(1) and the second output image 232(2) are evaluated by the discriminator module 240 to determine discriminator loss data 254 that is indicative of whether the output image 232 is consistent with the previously provided actual training data 202. For example, if the generative module 230 generates a synthetic image of what appears to be a hand with a hole in the palm, the discriminator module 240 may detect that this is not likely to be consistent with the actual training data 202 and produce discriminator loss data 254 indicating a relatively high loss value.

The embedding module 162 may also be used to assess the output images 232. In one implementation, operation of the embedding module 162 may take place in parallel with at least a portion of operation of the discriminator module 240. In one implementation loss data may be determined. During operation, a neural network attempts to optimize weights that associate an input to some output. These optimizations use loss functions. For example, a margin-loss function may be used to evaluate one or more weights. The output of a loss function is loss data.

The output image(s) 232 may be processed by the embedding module 162, and the loss data associated with that processing may be assessed. This allows the pair of output image(s) 232 to be assessed relative to one another. For example, the output image(s) 232 may be processed by the embedding module 162 to determine embedding vector data 164. During processing by the neural network of the embedding module 162, one or more of appearance loss data 250 or identification (ID) loss data 252 may be determined. The appearance loss data 250 may be indicative of how the appearance of the first output image 232(1) differs from the second output image 232(2). Because the synthetic latent vectors in the first training input 280(1) and the second training input 280(2) are known, it is possible to determine what relationship exists between the first output image 232(1) and the second output image 232(2). For example, if the same synthetic appearance vector was used in the first training input 280(1) and the second training input 280(2), the pair of resulting output images 232 should have the same overall appearance, and so the appearance loss data 250 should be less than a first threshold value. Continuing the example, the first output image 232(1) and the second output image 232(2) should have the same pose, articulation, jewelry, and may have similar lighting.

Similarly, the identification loss data 252 may be indicative of how the identifying features present in the first output image 232(1) differ from the identifying features in the second output image 232(2). Because the output images 232 do differ, there may be a greater variation than a comparison of the appearance loss data 250 even with output images 232 generated from the same synthetic identification vector. For example, the synthetic identification vector in the first training input 280(1) and the second training input 280(2) may be the same, representing the same synthetic identity. Given this information, the resulting first output image 232(1) and the second output image 232(2) should similar, but are unlikely to be identical. As a result, the identification loss data 252 should be less than a second threshold value for output images 232 generated from the same synthetic identification vector. In another example, the identification loss data 252 should be greater than the second threshold value for output images 232 generated from different synthetic identification vectors.

Backpropagation data 256 may be determined and provided to train the neural network of the generative module 230. The backpropagation data 256 may comprise one or more of the discriminator loss data 254, the appearance loss data 250, the identification loss data 252, or other loss data. In some implementations, the backpropagation data 256 may include information indicative of any known relationship between the first training input 280(1) and the second training input 280(2). For example, the backpropagation data 256 may include information indicative of, or may be based on, known input vectors 360. The known input vectors 360 may comprise information about the training input 280. For example, the backpropagation data 256 may include data that the first training input 280(1) and the second training input 280(2) contained the same identification vector.

One or more values associated with operation of the generative module 230 may change responsive to the backpropagation data 256. For example, some weights in the neural network of the generative module 230 may increase or decrease. The process may then iterate again, with the training input 280 containing another set of one or more synthetic vectors that are then used as input to the GAN module 220. As the process iterates, the GAN module 220 learns to produce one or more output images 232, such as synthetic multimodal image data.

Turning to FIG. 2B, a synthetic training input generator module 270 may be used to generate the training input 280. The synthetic training input generator module 270 may use information, such as latent vector space data 272, to determine one or more synthetic vectors. While training the GAN module 220, the synthetic training input generator module 270 may randomly generate first training input 280(1), second training input 280(2), and so forth. During training of the GAN module 220, the synthetic training input generator module 270 may generate pairs of training synthetic vectors. For example, the training input 280 may comprise one or more of a training synthetic demographic vector 282, a training synthetic appearance vector 284, or a training synthetic identification vector 286. The training input 280 may be provided to the generative module 230 during training of the GAN.

In some implementations, the GAN module 220 may be trained to generate particular types of output images 232. This training may be facilitated by selecting training synthetic vectors that are within a particular range or volume of a latent vector space. For example, if the GAN module 220 will be trained to generate output images 232 that would be associated with a particular category type 208 and category value 210, the synthetic training input generator module 270 may provide training synthetic vectors consistent with that requirement.

As a result of training the GAN module 220, the neural network of the GAN module 220 determines latent vector space data 272 that is representative of the latent vectors. For example, the latent vector space data 272 may be determined by one or more layers of the neural network of the generative module 230. The latent vector space data 272 may comprise one or more of latent demographic vector space 274, latent appearance vector space 276, latent identification vector space 278, and so forth.

The latent demographic vector space 274 comprises one or more dimensions in a latent vector space that correspond to demographic data of category data 206. The latent demographic vector space 274 may comprise a first Gaussian distribution of latent vector values determined by the GAN module 220 based on training. In other implementations, other latent vector spaces may be used that are associated with one or more category types 208 or the category values 210 associated with those category types 208 that are associated with the actual training data 202. For example, the category data 206 associated with the actual image data 204 used to train the discriminator module 240 may be expressed as one or more latent demographic vectors that are within a first volume of the vector space.

The latent appearance vector space 276 comprises one or more dimensions in the latent vector space that corresponds to appearance of the hands 102 presented in the actual training data 202. The latent appearance vector space 276 may be associated with pose, articulation, lighting, jewelry, clothing, and so forth of the hand 102. For example, the various appearances of hands 102 associated with the actual image data 204 may be expressed as one or more latent appearance vectors that are within a second volume of the vector space.

The latent identification vector space 278 comprises one or more dimensions in the latent vector space that correspond to identifying features of the hands 102 presented in the actual training data 202 that are used to distinguish the hands 102 from one another. For example, the latent identification vector space 278 may be associated with creases, ridges, callouses, veins, muscles, and so forth of the hand 102. Different identities of different hands 102 in the actual image data 204 may be expressed as one or more latent identification vectors that are within a third volume of the vector space. The latent identification vector space 278 may include, but is not limited to, those features that may be apparent to a human observer.

Figure 3:
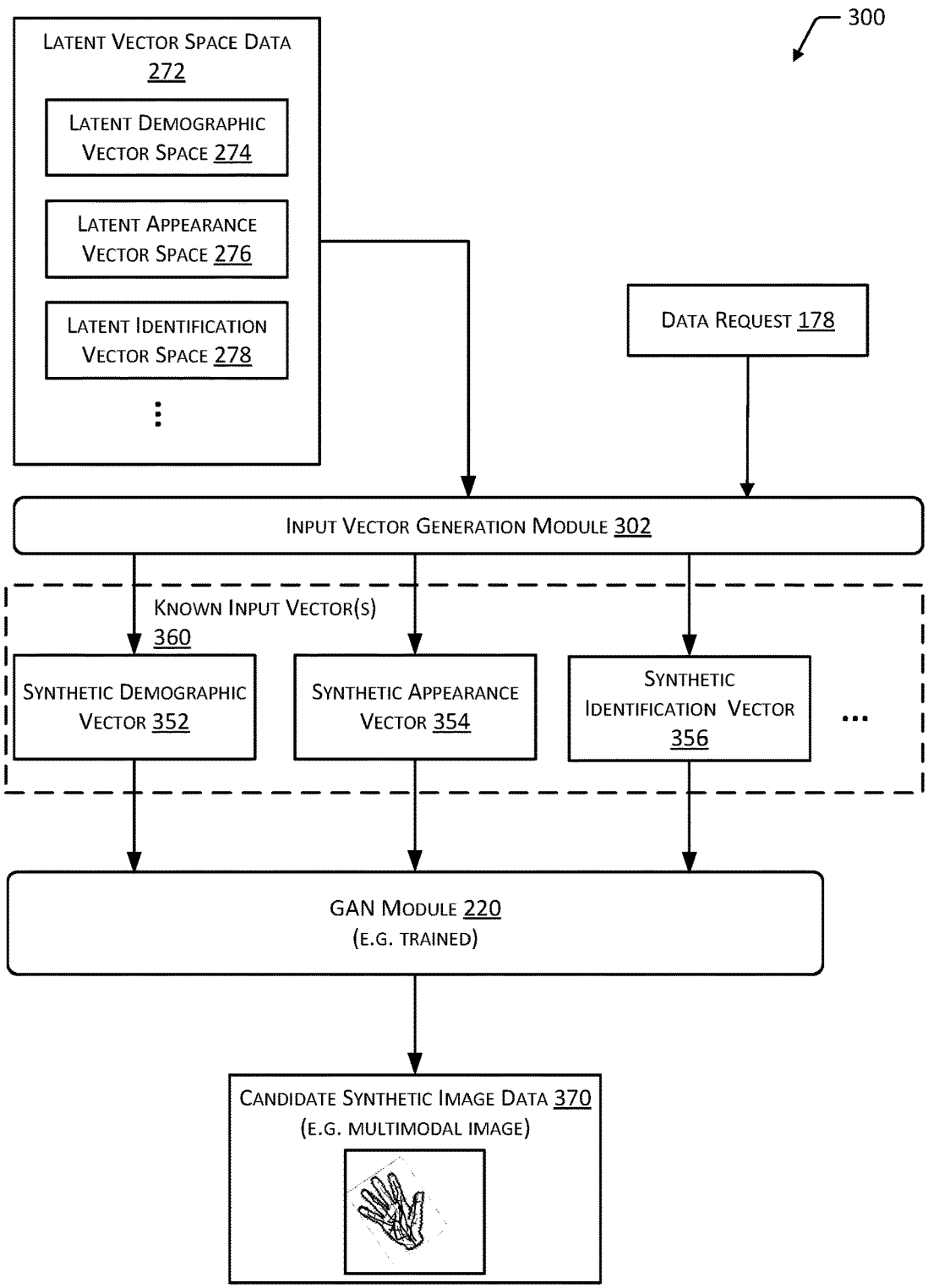
FIG. 3 illustrates using synthetic latent vectors as input to a portion of the second machine learning system to generate candidate synthetic image data, according to some implementations.

FIG. 3 illustrates at 300 use of synthetic latent vectors as input to the GAN module 220 to generate candidate synthetic image data 370, according to some implementations. The synthetic image generation module 140 may include an input vector generation module 302. The input vector generation module 302 provides as output synthetic vectors that are then used as inputs to the GAN module 220 to generate the candidate synthetic image data 370.

The input vector generation module 302 may determine synthetic vectors that are within the latent vector space described by the latent vector space data 272. The synthetic vectors used to generate candidate synthetic image data 370 may be constrained to values that are within the latent vector space that reduce the likelihood that the GAN module 220 will generate a synthetic image that so deviates from the actual training data 202 that the output would be discarded. This reduces usage of computing resources that would otherwise be expended without benefit. Constraining the synthetic vectors to values that are within the latent vector space may also improve the realism of the output preventing the appearance of extremely unlikely or physically impossible situations, such as output depicting a ring that spans the palm of the hand, or a palm that has only a single vein.

The input vector generation module 302 may generate known input vector(s) 360 that may comprise one or more of a synthetic demographic vector 352, a synthetic appearance vector 354, a synthetic identification vector 356, or other vectors. These known input vector(s) 360 may then be provided to the trained GAN module 220 to generate candidate synthetic image data 370.

The synthetic demographic vector 352 may comprise a vector that is constrained to the latent demographic vector space 274. The synthetic appearance vector 354 may comprise a vector that is constrained to the latent appearance vector space 276. The synthetic identification vector 356 may comprise a vector that is constrained to the latent identification vector space 278.

By controlling the synthetic vectors provided to the GAN module 220, the system is able to provide substantial flexibility in generating synthetic image data 150 for inclusion in the recognition input data 152. By varying the values of the synthetic vectors, candidate synthetic image data 370 may be generated. For example, a random generation of synthetic identification vectors 356 may be used to generate candidate synthetic image data 370 that may be associated with different synthetic identities. In another example, appearance values may be selected to generate candidate synthetic image data 370 that includes obscuring sleeves, jewelry, and so forth.

As described above, during training of the GAN module 220, information based on the known input vectors 360 may be used to determine backpropagation data 256 or otherwise facilitate training of the generative module 230. For example, information about the same synthetic identification vector 356 being used in the first training input 280(1) and the second training input 280(2) may be used to modify how the identification loss data 252 affects training of the generative module 230.

In some implementations, the input vector generation module 302 may determine the synthetic vectors based at least in part on the data request 178. For example, the data request 178 may indicate that recognition accuracy for hands 102 associated with a particular category value 210 such as "age bracket 70-90" is less than a desired threshold. Responsive to the data request 178, the input vector generation module 302 may specify synthetic demographic vectors 352 that correspond to "age bracket 70-90", while allowing for random selection of synthetic appearance vectors 354, synthetic identification vectors 356, and so forth.

The operation of the input vector generation module 302 allows highly specific generation of candidate synthetic image data 370. For example, the input vector generation module 302 could determine synthetic vectors that are associated with particular demographic data, a particular appearance, a particular identity, and so forth. This facilitates the generation of synthetic image data 150 for situations such as same identity but different appearances, same appearance but different identities, and so forth.

The candidate synthetic image data 370 may comprise multimodal images. For example, the multimodal image may comprise a first channel that comprises data that appears to show surface features of a synthetic hand 102, such as creases, wrinkles, scars, dermal papillae ridges, and so forth. Continuing the example, a second channel of the multimodal image may appear to show deeper features of the synthetic hand 102, such as veins, bones, soft tissue, or other sub-surface features.

Figure 4:
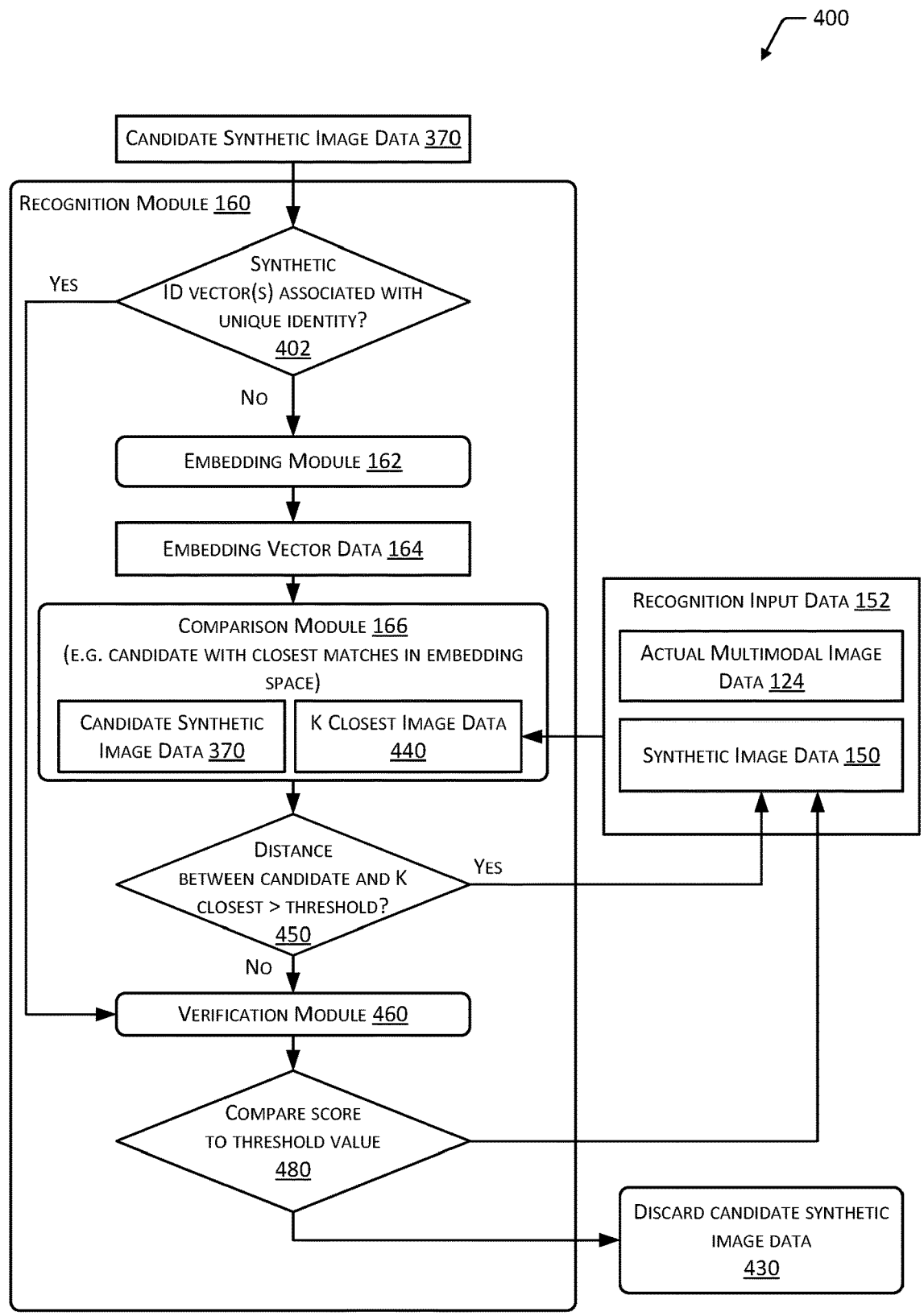
FIG. 4 illustrates assessing the candidate synthetic image data to determine if it is suitable for inclusion in the synthetic image data for use in training or evaluation of the first machine learning system, according to some implementations.

FIG. 4 illustrates at 400 assessing the candidate synthetic image data 370 to determine if it is suitable for inclusion in the synthetic image data 150. The synthetic image data 150 may then be included in the recognition input data 152 that is used to evaluate or train the recognition module 160, according to some implementations.

At 402 a determination is made as to whether the synthetic identification vector 356 that is associated with the candidate synthetic image data 370 is associated with a unique identity. For example, the known input vectors 360 may be used to determine if the synthetic identification vector 356 used to generate the candidate synthetic image data 370 is associated with a previously generated synthetic identity, or in some implementations, an actual identity. In some situations, a previously generated synthetic identity may be used to create a set of images. For example, candidate synthetic image data 370 may be generated using the same synthetic identification vector 356 as input to the generative module 230 while the synthetic appearance vector 354 changes. This would produce candidate synthetic image data 370 containing the same identifying features shown in different appearances. If at 402 the synthetic identification vector 356 is determined to be associated with a known previous identity, the process may proceed to 460. If not, the embedding module 162 may be used to determine if the candidate synthetic image data 370 is deemed to be a unique identity. In some implementations 402 may be omitted and the candidate synthetic image data 370 may be processed by both the verification module 460 and the embedding module 162.

The candidate synthetic image data 370 may be processed by the recognition module 160 to determine if the synthetic identity associated with the candidate synthetic image data 370 is too similar to previously stored recognition input data 152. The candidate synthetic image data 370 is processed by the embedding module 162 to determine embedding vector data 164. The embedding vector data 164 may be considered a set of values that are descriptive of the (synthetic) hand 102 or other object depicted in the image data, and may act as a signature that is uniquely associated with the identity of the user.

The embedding vector data 164 is processed by the comparison module 166. The comparison module 166 determine a set of k closest image data 440 from the recognition input data 152, where k is a nonzero positive integer. The recognition input data 152 may comprise one or more of the actual multimodal image data 124 or the synthetic image data 150. For example, the embedding vector data 164 expresses a point in an embedding vector space. The corresponding points in the embedding vector space of other embedding vector data 164 associated with the recognition input data 152 may be compared. A distance may be determined between the point associated with the embedding vector data 164 of the candidate synthetic image data 370 and the points associated with embedding vector data 164 from previously stored recognition input data 152. The value of k may be specified or dynamically adjusted. For example, k may be set to 10.

At 450 a determination is made as to whether a first distance in the embedding space between the point associated with the output image(s) 232 and a closest point corresponding to the k closest image data 440 is greater than a distance threshold value. If yes, the candidate synthetic image data 370 may be deemed sufficiently unique relative to the recognition input data 152, and so the candidate synthetic image data 370 is stored as synthetic image data 150.

If at 450 the distance between the point associated with the output image(s) 232 and the k closest image data 440 is less than the distance threshold value, the process may proceed to use a verification module 460.

The verification module 460 may accept as input the candidate synthetic image data 370 and the k closest image data 440. The verification module 460 may comprise a machine learning system, such as a convolutional neural network, that has been trained to provide as output a score that is indicative of likelihood that a first identity expressed in the candidate synthetic image data 370 is different from a second identity expressed in second image data. For example, the verification module 460 may operate by testing the candidate synthetic image data 370 with individual ones of the synthetic image data 150 in the k closest image data 440.

The verification module 460 is trained to provide a score for comparison of identifying features between a pair of input images. For example, as the value of the score increases, the similarity between the identifying features increases. The verification module 460 takes into consideration finer details that may be present in both images. In comparison, the recognition module 460 is trained to generate embedding vector data 164, that may be subsequently used for a computationally efficient Euclidean distance comparison. As a result, relative to the overall number of comparisons being performed, the operation of the verification module 460 is computationally intensive compared to the operation of the recognition module 160.

At 480, the score determined by the verification module 460 is compared to a threshold value. The comparison may be determined based on whether the identification vectors used to generate the candidate synthetic image data 370 are the same.

In a first implementation in which the same identification vectors have been used to generate the candidate synthetic image data 370, if the score is greater than a threshold value, the candidate synthetic image data 370 is stored as synthetic image data 150. If the score is determined at 480 to be less than or equal to the threshold value, the process proceeds to 430 and the candidate synthetic image data 370 is discarded.

In a second implementation in which different identification vectors have been used to generate the candidate synthetic image data 370, if the score is less than or equal to the threshold value, the process proceeds to store the candidate synthetic image data 370 as synthetic image data 150. If the score is greater than the threshold value, the process proceeds to 430 and the candidate synthetic image data 370 is discarded.

As described above, in some implementations, additional samples of synthetic image data 150 may be generated for a particular identity. For example, the same source synthetic identification vector 356 may be used in combination with ten different synthetic appearance vectors 354 to generate ten samples of candidate synthetic image data 370 that are intended to express the same synthetic identity but with different appearances. To confirm the candidate synthetic image data 370 contains features that are consistent with that identity, the verification module 460 may be used to compare the candidate synthetic image data 370 with previously stored synthetic image data 150 associated with the synthetic identification vector 356.

Figure 5:
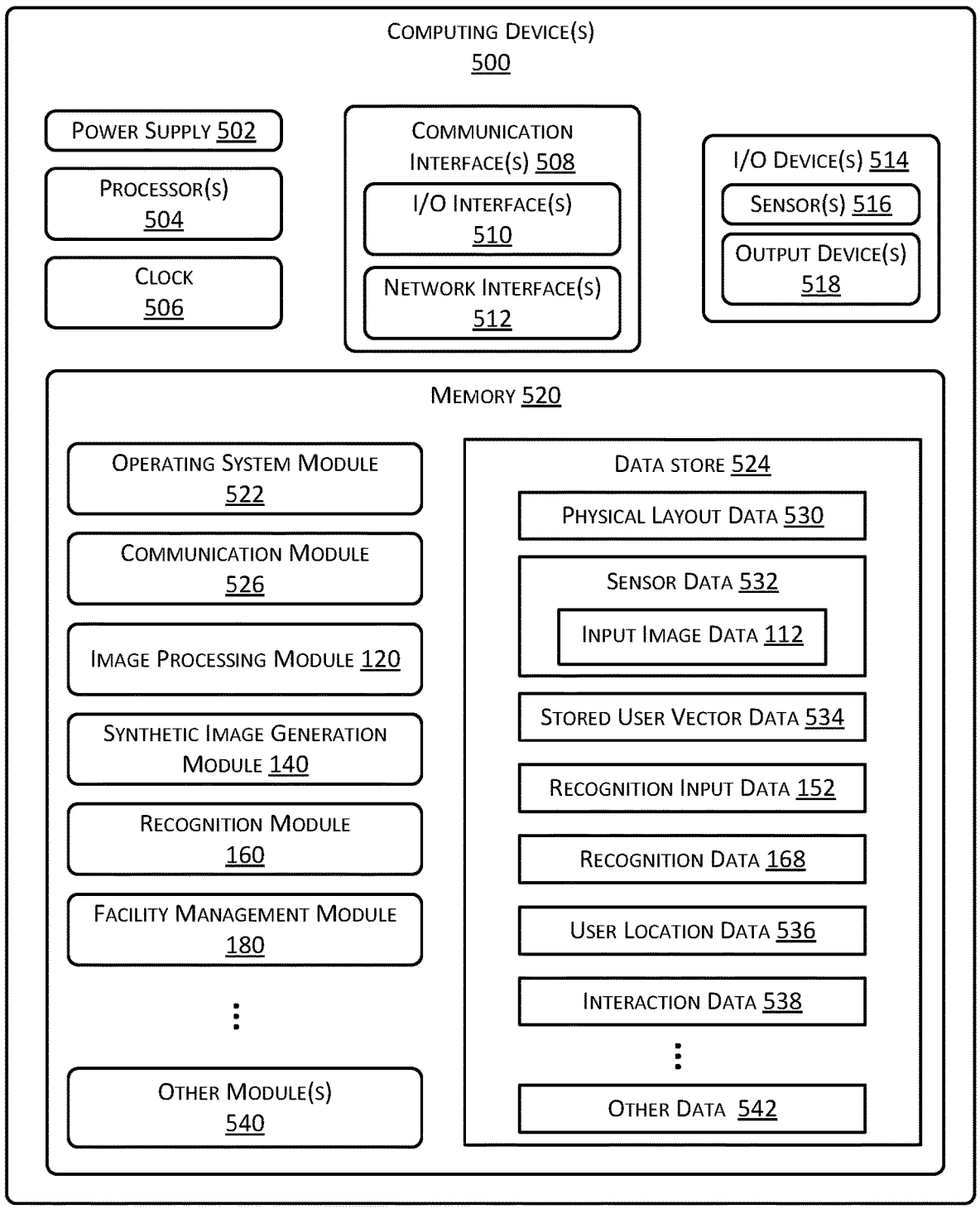
FIG. 5 is a block diagram of a computing device to use synthetic image data for training or evaluating the first machine learning system to perform recognition, according to some implementations.

FIG. 5 is a block diagram of a computing device 500 to use synthetic image data 150 for training or evaluating a machine learning system to perform recognition, according to some implementations.

The computing device 500 may be within the scanner 104, may comprise a server, and so forth. The computing device 500 may be physically present at the facility, may be accessible by a network, or a combination of both. The computing device 500 does not require end-user knowledge of the physical location and configuration of the system that delivers the services. Common expressions associated with the computing device 500 may include "embedded system", "on-demand computing", "software as a service (SaaS)", "platform computing", "network-accessible platform", "cloud services", "data centers", and so forth. Services provided by the computing device 500 may be distributed across one or more physical or virtual devices.

One or more power supplies 502 may be configured to provide electrical power suitable for operating the components in the computing device 500. The one or more power supplies 502 may comprise batteries, capacitors, fuel cells, photovoltaic cells, wireless power receivers, conductive couplings suitable for attachment to a power source such as provided by an electric utility, and so forth. The computing device 500 may include one or more hardware processors 504 (processors) configured to execute one or more stored instructions. The processors 504 may comprise one or more cores. One or more clocks 506 may provide information indicative of date, time, ticks, and so forth. For example, the processor 504 may use data from the clock 506 to associate a particular interaction with a particular point in time.

The computing device 500 may include one or more communication interfaces 508 such as input/output (I/O) interfaces 510, network interfaces 512, and so forth. The communication interfaces 508 enable the computing device 500, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include input devices such as one or more of a sensor 516, keyboard, mouse, scanner, and so forth. The I/O devices 514 may also include output devices 518 such as one or more of a display device, printer, audio speakers, and so forth. In some embodiments, the I/O devices 514 may be physically incorporated with the computing device 500 or may be externally placed.

The network interfaces 512 may be configured to provide communications between the computing device 500 and other devices, such as carts, routers, access points, and so forth. The network interfaces 512 may include devices configured to couple to personal area networks (PANS), local area networks (LANs), wireless local area networks (WLANS), wide area networks (WANs), and so forth. For example, the network interfaces 512 may include devices compatible with Ethernet, Wi-Fi, Bluetooth, ZigBee, and so forth.

The computing device 500 may also include one or more busses or other internal communications hardware or software that allow for the transfer of data between the various modules and components of the computing device 500.

As shown in FIG. 5, the computing device 500 includes one or more memories 520. The memory 520 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 520 provides storage of computer-readable instructions, data structures, program modules, and other data for the operation of the computing device 500. A few example functional modules are shown stored in the memory 520, although the same functionality may alternatively be implemented in hardware, firmware, or as a system on a chip (SoC).

The memory 520 may include at least one operating system (OS) module 522. The OS module 522 is configured to manage hardware resource devices such as the I/O interfaces 510, the I/O devices 514, the communication interfaces 508, and provide various services to applications or modules executing on the processors 504. The OS module 522 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 520 may be a data store 524 and one or more of the following modules. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including the computing devices 500, network attached storage devices, and so forth.

A communication module 526 may be configured to establish communications with one or more of the carts, sensors 516, display devices, other computing devices 500, or other devices. The communications may be authenticated, encrypted, and so forth.

The memory 520 may also store one or more of the image processing module 120, the synthetic image generation module 140, the recognition module 160, and the recognition assessment module 170, as described above.

The memory 520 may store the facility management module 180. The facility management module 180 may perform various functions, such as tracking items between different inventory locations or to and from the carts, generating restocking orders, directing operation of robots within the facility, using the recognition data 168 to associate a particular user identity with a user in the facility, and so forth. During operation, the facility management module 180 may access sensor data 532 such as one or more of image data from cameras, weight data from weight sensors, and so forth.

Information used by the facility management module 180 may be stored in the data store 524. For example, the data store 524 may be used to store physical layout data 530, sensor data 532, stored user vector data 534, recognition data 168, user location data 536, interaction data 538, and so forth.

The physical layout data 530 may provide information indicative of where scanners 104, cameras, weight sensors, antennas for radio receivers, inventory locations, and so forth are in the facility with respect to one another. For example, the physical layout data 530 may comprise information representative of a map or floor plan of the facility with relative positions of gates with scanners 104 and inventory locations.

The sensor data 532 may comprise information obtained from one or more of the sensors 516 in or associated with the facility.

The stored user vector data 534 may comprise vector data associated with particular user accounts. For example, the stored user vector data 534 may comprise embedding vector data 164 that associates particular signatures of features with particular user accounts.

The facility management module 180 may generate the user location data 536 that is indicative of the location of the user within the facility. For example, the facility management module 180 may use image data obtained by the cameras to determine a location of the user. In other implementations, other techniques may be used for determining the user location data 536. For example, data from a smart floor may be used to determine the location of the user.

A user identity may be associated with user location data 536 based on the recognition data 168. For example, the user enters the facility and has their palm scanned, producing recognition data 168 that is indicative of their time of entry, a scanner 104 associated with where they entered, and their user identifier. The user location data 536 indicative of a path of a user that begins at the scanner 104 at the time of entry may be associated with the user identifier in the recognition data 168.

Based on the user location data 536 and the interaction data 538, a particular interaction may be associated with an account of a particular user. For example, if the user location data 536 indicates that the user is present in front of inventory location 492 at time 17:47:20 and the interaction data 538 indicates a pick of a quantity of one item from an area on inventory location 492 at 17:47:27, the user may be billed for that pick.

The facility management module 180 may use the sensor data 532 to generate the interaction data 538. The interaction data 538 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 180 may generate interaction data 538 that indicates what item the user picked from a particular lane on a shelf, and then use this interaction data 538 to adjust the count of inventory stowed at that lane. The interaction data 538 may then be used to bill an account associated with the user identifier that is associated with the user who picked the item.

The facility management module 180 may process the sensor data 532 and generate output data. For example, based on the interaction data 538, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 540 may also be present in the memory 520 as well as other data 542 in the data store 524. For example, a billing module may use the interaction data 538 and the recognition data 168 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the recognition data 168. In another example, a robot may incorporate a scanner 104. The robot may use the recognition data 168 to determine whether to deliver a parcel to the user, and based on the recognition data 168, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a memory, storing first computer-executable instructions; and
    one or more hardware processors to execute the first computer-executable instructions to:
        acquire a first set of actual images of a portion of a hand, wherein each image is representative of an appearance of the hand and identifying features of the hand;
        train a first machine learning system using the first set of actual images;
        determine, based on the trained first machine learning system:
            a first latent vector space that is associated with appearance of the hand; and
            a second latent vector space that is associated with identifying features of the hand;
        determine a first synthetic vector from the first latent vector space;
        determine a second synthetic vector from the second latent vector space;
        generate candidate synthetic image data using the first synthetic vector and the second synthetic vector as inputs to the trained first machine learning system, wherein the candidate synthetic image data is associated with a first identity;
        determine the candidate synthetic image data is suitable for training; and
        train a second machine learning system using input data comprising the candidate synthetic image data.

2. The system of claim 1, wherein:
    the first synthetic vector is determined by random selection from a first Gaussian distribution of latent vector values determined by the first machine learning system based on the first set of actual images; and
    the second synthetic vector is determined by random selection from a second Gaussian distribution of latent vector values determined by the first machine learning system based on the first set of actual images.

3. The system of claim 1, further comprising instructions to:
    acquire a first set of demographic data that is associated with the first set of actual images;
    wherein the first machine learning system is trained using the first set of demographic data;
    determine, based on the trained first machine learning system:
        a third latent vector space that is associated with demographic data associated with the hand;
    determine a third synthetic vector from the third latent vector space; and
    wherein the candidate synthetic image data is generated using the third synthetic vector as an input to the trained first machine learning system.

4. The system of claim 1, the instructions to train the first machine learning system further comprising instructions to:
    generate a first output image and a second output image using a generative network;
    determine first loss data by processing the first output image and the second output image with the second machine learning system, wherein the first loss data is indicative of one or more differences between identifying features in the first output image and the second output image;
    determine second loss data by processing the first output image and the second output image with the second machine learning system, wherein the second loss data is indicative of one or more differences between appearance of the first output image and the second output image; and
    provide the first loss data and the second loss data to the generative network.

5. The system of claim 1, the instructions to determine the candidate synthetic image data is suitable for training comprising instructions to:
    determine, based on the candidate synthetic image data, first embedding vector data using the second machine learning system;
    determine second embedding vector data associated with second image data, wherein the second image data is associated with a second identity;
    determine the first embedding vector data is within a threshold distance of the second embedding vector data;
    determine a first score, based on the candidate synthetic image data and the second image data, wherein the first score is indicative of a likelihood that the first identity expressed in the candidate synthetic image data is different from the second identity expressed in the second image data; and
    determine the first score is greater than a second threshold value.

6. The system of claim 1, further comprising instructions to:
    determine a third synthetic vector, wherein the third synthetic vector is within a threshold distance of the second synthetic vector in the second latent vector space and is associated with a second identity;
    generate second candidate synthetic image data using the first synthetic vector and the third synthetic vector as inputs to the trained first machine learning system, wherein the second candidate synthetic image data is associated with the second identity;
    determine the second candidate synthetic image data is suitable for training; and
    train the second machine learning system using the input data further comprising the second candidate synthetic image data.

7. The system of claim 1, further comprising instructions to:
    determine a third synthetic vector, wherein the third synthetic vector is greater than a threshold distance from the first synthetic vector in the first latent vector space and is associated with a second appearance;
generate second candidate synthetic image data using the first synthetic vector and the third synthetic vector as inputs to the trained first machine learning system, wherein the second candidate synthetic image data is associated with the first identity;
determine the second candidate synthetic image data is suitable for training; and
train the second machine learning system using the input data further comprising the second candidate synthetic image data.

8. The system of claim 1, wherein the first set of actual images comprise multimodal images, each multimodal image comprising:
a first channel indicative of an image of the hand illuminated with light having a first polarization; and
a second channel indicative of an image of the hand illuminated with light having a second polarization.

9. A method comprising:
acquiring a first set of images, wherein each image is representative of at least a portion of a person;
training a first machine learning system using the first set of images;
determining, based on the trained first machine learning system:
a first latent vector space that is associated with appearance of a person; and
a second latent vector space that is associated with identifying features of the person;
determining a first synthetic vector from the first latent vector space;
determining a second synthetic vector from the second latent vector space;
generating candidate synthetic image data using the first synthetic vector and the second synthetic vector as inputs to the trained first machine learning system, wherein the candidate synthetic image data is associated with a first identity;
determining the candidate synthetic image data is suitable for use as input data; and
processing the input data using a second machine learning system using the input data comprising the candidate synthetic image data.

10. The method of claim 9, wherein:
the first synthetic vector is determined from a first Gaussian distribution of latent vector values determined by the first machine learning system based on the first set of images; and
the second synthetic vector is determined from a second Gaussian distribution of latent vector values determined by the first machine learning system based on the first set of images.

11. The method of claim 9, further comprising:
acquiring a first set of demographic data that is associated with the first set of images;
wherein the training the first machine learning system uses the first set of demographic data;
determining, based on the trained first machine learning system:
a third latent vector space that is associated with demographic data associated with the person; and
determining a third synthetic vector from the third latent vector space;
wherein the generating the candidate synthetic image data comprises the third synthetic vector as an input to the trained first machine learning system.

12. The method of claim 9, wherein the first set of images comprise multimodal image data; and
the training the first machine learning system comprising:
generating a first output image and a second output image using a generative network;
determining first loss data by processing the first output image and the second output image with the second machine learning system, wherein the first loss data is indicative of one or more differences between identifying features in the first output image and the second output image;
determining second loss data by processing the first output image and the second output image with the second machine learning system, wherein the second loss data is indicative of one or more differences between appearance of the first output image and the second output image; and
providing the first loss data and the second loss data to the generative network.

13. The method of claim 9, the determining the candidate synthetic image data is suitable for training comprising:
determining, based on the candidate synthetic image data, first embedding vector data using the second machine learning system;
determining second embedding vector data associated with second image data, wherein the second image data is associated with a second identity;
determining the first embedding vector data is within a threshold distance of the second embedding vector data;
determining a first score, based on the candidate synthetic image data and the second image data, wherein the first score is indicative of a likelihood that the first identity expressed in the candidate synthetic image data is different from the second identity expressed in second image data; and
determining the first score is less than a second threshold value.

14. The method of claim 9, further comprising:
determining a third synthetic vector, wherein the third synthetic vector is within a threshold distance of the second synthetic vector in the second latent vector space and is associated with a second identity;
generating second candidate synthetic image data using the first synthetic vector and the third synthetic vector as inputs to the trained first machine learning system, wherein the second candidate synthetic image data is associated with the second identity;
determining the second candidate synthetic image data is suitable for use as input data; and
wherein the input data comprises the second candidate synthetic image data.

15. The method of claim 9, further comprising:
determining a third synthetic vector, wherein the third synthetic vector is greater than a threshold distance from the first synthetic vector in the first latent vector space and is associated with a second appearance;
generating second candidate synthetic image data using the first synthetic vector and the third synthetic vector as inputs to the trained first machine learning system, wherein the second candidate synthetic image data is associated with the first identity;
determining the second candidate synthetic image data is suitable for use as input data; and
wherein the input data comprises the second candidate synthetic image data.

16. The method of claim 9, further comprising:

acquiring a first image of a hand illuminated with light having a first polarization;

acquiring a second image of the hand illuminated with light having a second polarization;

generating a multimodal image comprising a first channel based on the first image and a second channel based on the second image; and wherein the first set of images comprises a plurality of multimodal images.

17. A system comprising:

a memory, storing first computer-executable instructions; and one or more hardware processors to execute the first computer-executable instructions to:

acquire a first set of images, wherein each image is representative of at least a portion of a person;

train a first machine learning system using the first set of images;

determine, based on the trained first machine learning system, one or more latent vector spaces;

determine one or more synthetic vectors from the one or more latent vector spaces;

generate candidate synthetic image data using the one or more synthetic vectors, wherein the candidate synthetic image data is associated with a first identity;

determine the candidate synthetic image data is suitable for use as input data; and process at least a portion of the input data comprising the candidate synthetic image data using a second machine learning system.

18. The system of claim 17, further comprising instructions to:

acquire a first set of demographic data that is associated with the first set of images;

wherein the first machine learning system is trained using the first set of demographic data;

determine, based on the trained first machine learning system:

a first latent vector space that is associated with demographic data associated with the person;

determine a first synthetic vector from the first latent vector space; and wherein the one or more synthetic vectors comprises the first synthetic vector.

19. The system of claim 17, wherein the first set of images comprise multimodal image data; and the training the first machine learning system comprising:

generating a first output image and a second output image using a generative network;

determining first loss data by processing the first output image and the second output image with the second machine learning system, wherein the first loss data is indicative of one or more differences between identifying features in the first output image and the second output image;

determining second loss data by processing the first output image and the second output image with the second machine learning system, wherein the second loss data is indicative of one or more differences between appearance of the first output image and the second output image; and providing the first loss data and the second loss data to the generative network.

20. The system of claim 17, wherein the first set of images comprise multimodal images, each multimodal image comprising:

a first channel indicative of an image of a hand illuminated with light having a first polarization; and a second channel indicative of an image of the hand illuminated with light having a second polarization.

* * * * *

UNITED STATES PATENT AND TRADEMARK OFFICE
CERTIFICATE OF CORRECTION

| | |
|---|---|
| PATENT NO. | : 11,537,813 B1 |
| APPLICATION NO. | : 17/038648 |
| DATED | : December 27, 2022 |
| INVENTOR(S) | : Igor Kviatkovsky et al. |

It is certified that error appears in the above-identified patent and that said Letters Patent is hereby corrected as shown below:

In the Claims
Column 24, Claim 13, Line 35:
Currently reads: "...expressed in second"
Where it should read: --expressed in the second--.

Signed and Sealed this
Thirty-first Day of January, 2023

Katherine Kelly Vidal
*Director of the United States Patent and Trademark Office*